United States Patent [19]
Arai et al.

[11] Patent Number: 5,917,494
[45] Date of Patent: *Jun. 29, 1999

[54] TWO-DIMENSIONAL IMAGE GENERATOR OF A MOVING OBJECT AND A STATIONARY OBJECT

[75] Inventors: Masatoshi Arai; Masanori Kubo; Koichi Murakami, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/633,553

[22] Filed: Apr. 17, 1996

[30] Foreign Application Priority Data

Sep. 28, 1995 [JP] Japan ................................ 7-251369

[51] Int. Cl.$^6$ ............................. G06F 17/14; H04N 5/262
[52] U.S. Cl. ............................................................. 345/419
[58] Field of Search .................................... 345/418–421, 345/433–438

[56] References Cited

U.S. PATENT DOCUMENTS 5,487,172   1/1996   Hyatt ..................................... 395/800

FOREIGN PATENT DOCUMENTS 4-40176   2/1992   Japan .

OTHER PUBLICATIONS

U.S. Appln. No. 08/369,110, filed Jan. 5, 1995, Masatoshi Arai, et al., *Image Generating Apparatus*.

*Primary Examiner*—Mark R. Powell
*Attorney, Agent, or Firm*—Staas & Halsey

[57] ABSTRACT

A display device and process used to display an image in which stationary objects and moving objects are displayed on a two-dimensional surface taking into consideration the depth relationship among the objects. By using the depth relationship among objects, moving objects may be seen to move in front of other objects and thereby obscure them or move behind other objects and thereby be obscured by them. This is accomplished by using prestored image data of the stationary objects and moving objects. A depth relationship relative to another moving object and stationary object is then obtained for each of portion of the prestored image data for each moving object for which a change has occurred between frames. The present invention uses an object buffer to expand difference data representing a difference between frames of prestored image data of a moving object. A bit map is used to contain bits uniquely assigned to each moving object. An overlay buffer sets and resets the bits assigned to the moving object in accordance with change lists generated from the difference data. A frame buffer is used to map pixel data for one frame in accordance with the results of the bit setting and resetting function of the overlay buffer for all moving objects in the overlay buffer.

11 Claims, 8 Drawing Sheets

BEFORE MOVEMENT → AFTER MOVEMENT

TWO-DIMENSIONAL IMAGE GENERATOR OF A MOVING OBJECT AND A STATIONARY OBJECT

BACKGROUND OF THE INVENTION

1. Field of the Invention

The present invention relates to an apparatus and method for generating an image for displaying a stationary object and a moving object on a two-dimensional surface by considering their depth relationships.

2. Description of Related Art

In recent years, demand for interaction between a human and a computer, generally known by the term man-machine interface or human-machine interface, has been increasing, and intuitive interactive methods utilizing the five senses of human beings have been developed using such techniques as artificial reality (AR) and virtual reality (VR). Also, in the field of personal computers (PCs), etc., apparatus, exemplified by game machines, have been introduced that provide high-speed image generation and animation functions whereby images change in response to operations performed by human users.

Furthermore, with increasing performance of computer systems, artificial creatures constructed from autonomous object groups have been conceived, and attempts have been made to realize, using a computer, a world where such artificial creatures live. An image generating apparatus for generating images and for displaying the actions of such artificial creatures has been proposed in a patent application filed by the present inventors (U.S. Ser. No. 08/369,110). According to this image generating apparatus, an action pattern that an artificial creature is thinking and wishing to perform is input as a command, and in accordance with the command, desired images are selected from a large number of stored image patterns, to generate and display successive images, thereby presenting the artificial creature's action as images and thus providing a participant with an experience as if he or she is in the real world.

In such an image generating apparatus, since moving objects, such as artificial creatures, and stationary objects, such as trees and mountains, actually existing in three-dimensional space, are displayed on a two-dimensional screen, it should be recognized that display images need to be generated by taking into account depth relationships between these objects. To accomplish this, in the prior art an image showing the overlaying of such objects is generated in the following manner.

Background data representing a stationary object is prepared, and the background thus prepared is drawn over a moving object region (a rectangular region containing the entire area of a moving object) that was drawn in the immediately preceding frame. For example, data of a real video image is input, and a Z value (a value representing the position in the depth direction, the value being larger for an object in the foreground) is compared for all objects to be displayed. Then, after drawing a moving object, a stationary object having a larger Z value than the moving object is drawn.

However, in the above prior art method, the rectangular region containing the entire image of the moving object is treated as a unit when generating a new image for the next frame by considering the depth relationships. This means that, when the moving object moves, depth relationships between objects have to be considered for all the pixels within the rectangular region though, in reality, interframe data changes occur only to part of the pixels within the rectangular region; that is, a large number of pixels are involved in considering the depth relationships, and this slows the processing speed.

SUMMARY OF THE INVENTION

A primary object of the invention is to provide an image generating apparatus and an image generation method wherein an image frame is created by considering depth relationships between objects only for pixels for which a change has occurred between frames, thereby achieving higher-speed image generation compared to the prior art.

According to the invention, in a process in which an image for displaying one or more stationary objects and one or more moving objects on a two-dimensional surface by considering their depth relationships, is generated by using prestored image data of the stationary objects and moving objects, a depth relationship relative to another moving object and stationary object is obtained for each of portion of prestored image data of each moving object for which a change has occurred between frames, and an image is generated by reference to the thus obtained depth relationship.

An image generating apparatus of the invention has: a first buffer for accepting an input of difference data representing a difference between frames of prestored image data of each moving object, and for expanding the difference data in a bit map with bits uniquely assigned to the moving object; a second buffer for setting and resetting, based on the difference data, the bits uniquely assigned to the moving object in the bit map; and a third buffer for bit-mapping pixel data for one frame in accordance with the results of the bit setting and resetting for all moving objects in the second buffer.

The image generating apparatus of the invention further includes a table that carries data for identifying pixel by pixel a stationary object most-forwardly located of the one or more stationary objects, wherein at every pixel location where a change has occurred between frames, the depth coordinate of each location in the table is compared with the depth coordinate of the moving object, in accordance with which result the kind of pixel data to be bit-mapped in the third buffer is determined.

Furthermore, when the difference data represents a difference between nonadjacent frames, the image generating apparatus of the invention includes means for generating difference data representing the difference between adjacent frames by interpolation from the difference data between nonadjacent frames.

In the image generating apparatus of the invention, since provisions are made to create an image frame by considering depth relationships between objects only for pixels for which a change has occurred between frames, higher-speed image generation can be achieved compared to the prior art.

The above and further objects and features of the invention will more fully be apparent from the following detailed description with accompanying drawings.

DESCRIPTION OF THE PREFERRED EMBODIMENTS

The present invention will be described in detail below.

Figure 1:
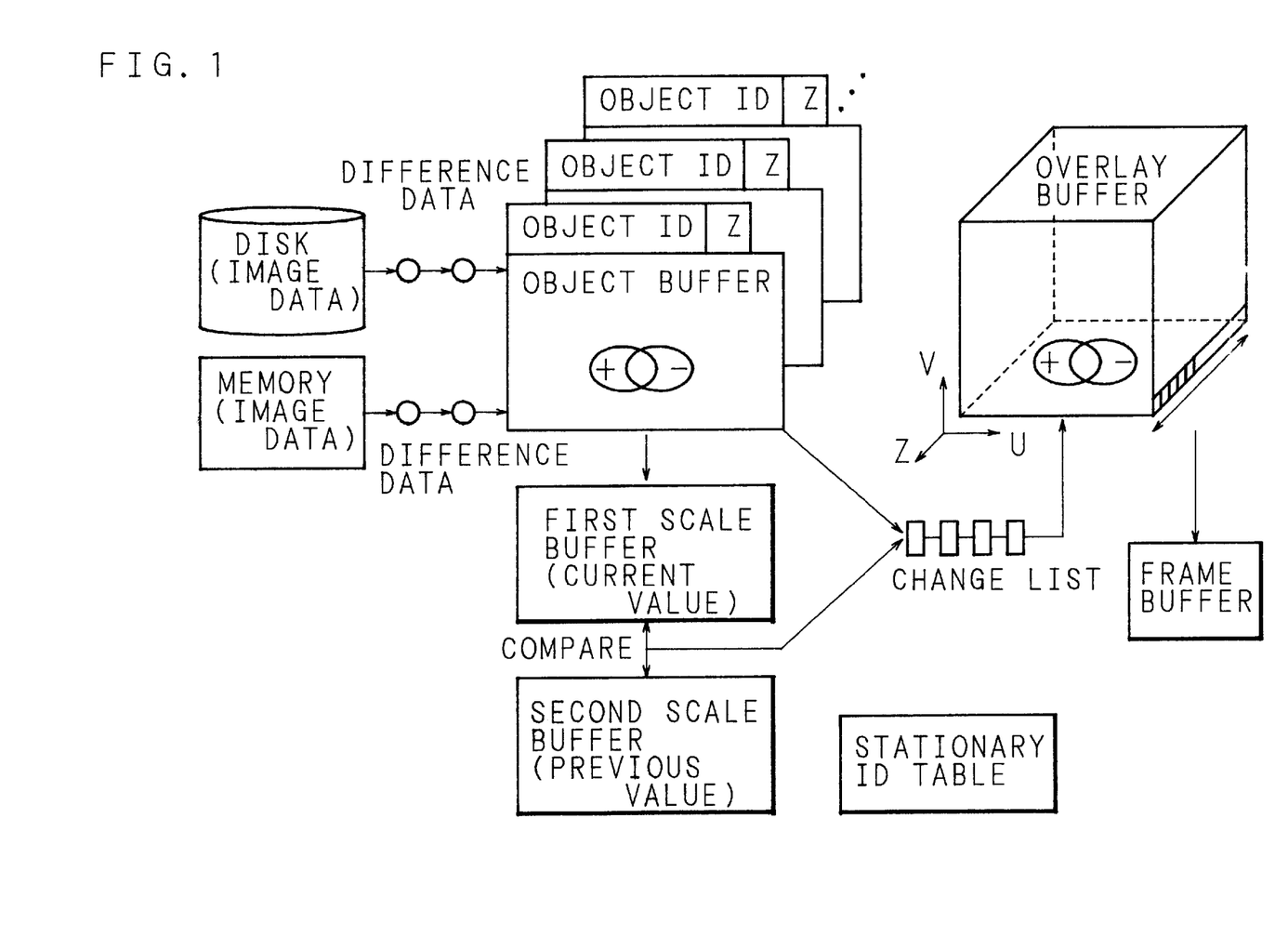
FIG. 1 is a diagram showing the concept of the present invention.

FIG. 1 is a schematic diagram showing the concept of the present invention. Difference data representing the difference in a moving object between adjacent frames, or between nonadjacent frames, is input from a disk or a memory into an object buffer. The disk stores image data of moving objects such as artificial creatures (characters) that exhibit nonconstant change patterns. On the other hand, the memory stores image data of moving objects that exhibit constant change patterns, such as an insect fluttering its wings in a regular and constant pattern.

There are provided as many object buffers as there are moving objects, in a one for one correspondence. Each object buffer carries an object ID for identifying its corresponding moving object and a Z value for that moving object. The difference data input for each moving object is bit-mapped in the corresponding object buffer.

Figure 2:
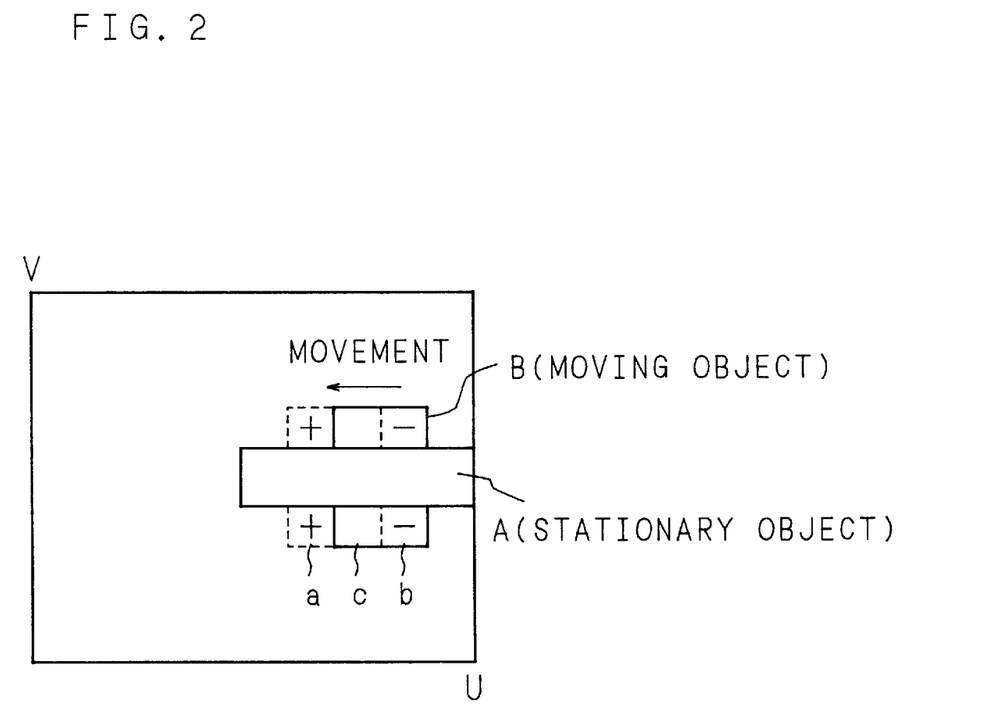
FIG. 2 is a diagram showing an example of an interframe change according to the present invention.

FIG. 2 is a diagram showing an example of an interframe change. The diagram shows a scene in which a moving object B, such as a bird, moves behind a stationary object A such as a tree, the solid lines indicating the position before the movement and the dashed lines after the movement. After the movement, the pixels relating to the moving object B can be grouped into pixels newly displaying the moving object B (pixels within region "a" in FIG. 2), pixels no longer displaying the moving object B (pixels within region "b" in FIG. 2), and pixels still displaying the moving object B (pixels within region "c" in FIG. 2). Here, the pixels into which the moving object B has moved are defined as "+" pixels, and the pixels out of which the moving object B has moved are defined as "−" pixels. Each object buffer therefore stores information about which pixels in the moving object are "+" pixels and which pixels are "−" pixels, that is, the coordinates (U, V) of the "+" pixels and "−" pixels on a two-dimensional screen.

In the case of a frame where a fake was applied, the difference data mapped in the corresponding object buffer is scaled and is transferred to a first scale buffer. At this time, the immediate previous difference data stored in the first scale buffer is transferred to a second scale buffer. Thus, the first scale buffer and the second scale buffer store the current difference data and the previous difference data, respectively. The term fake used here refers to generating a new image pattern by displacing an image pattern (translation, scaling, etc.), as described in the previously mentioned U.S. Ser. No. 08/369,110.

If no fakes have been applied, change lists are generated based on the difference data. On the other hand, if a fake has been applied, change lists are generated by comparing the data stored in the first and second scale buffers. Each change list holds a set of information consisting of the two-dimensional coordinates (U, V) indicating the position of the pixel, an object ID identifying the moving object concerned, and data indicating whether the pixel is a "+" pixel or "−" pixel.

In accordance with the thus generated change lists, bits uniquely assigned to each moving object are set or reset in an overlay buffer. In the overlay buffer, for a "+" pixel the bit of the moving object is set, and for a "−" pixel the bit of the moving object is reset.

Figure 3:
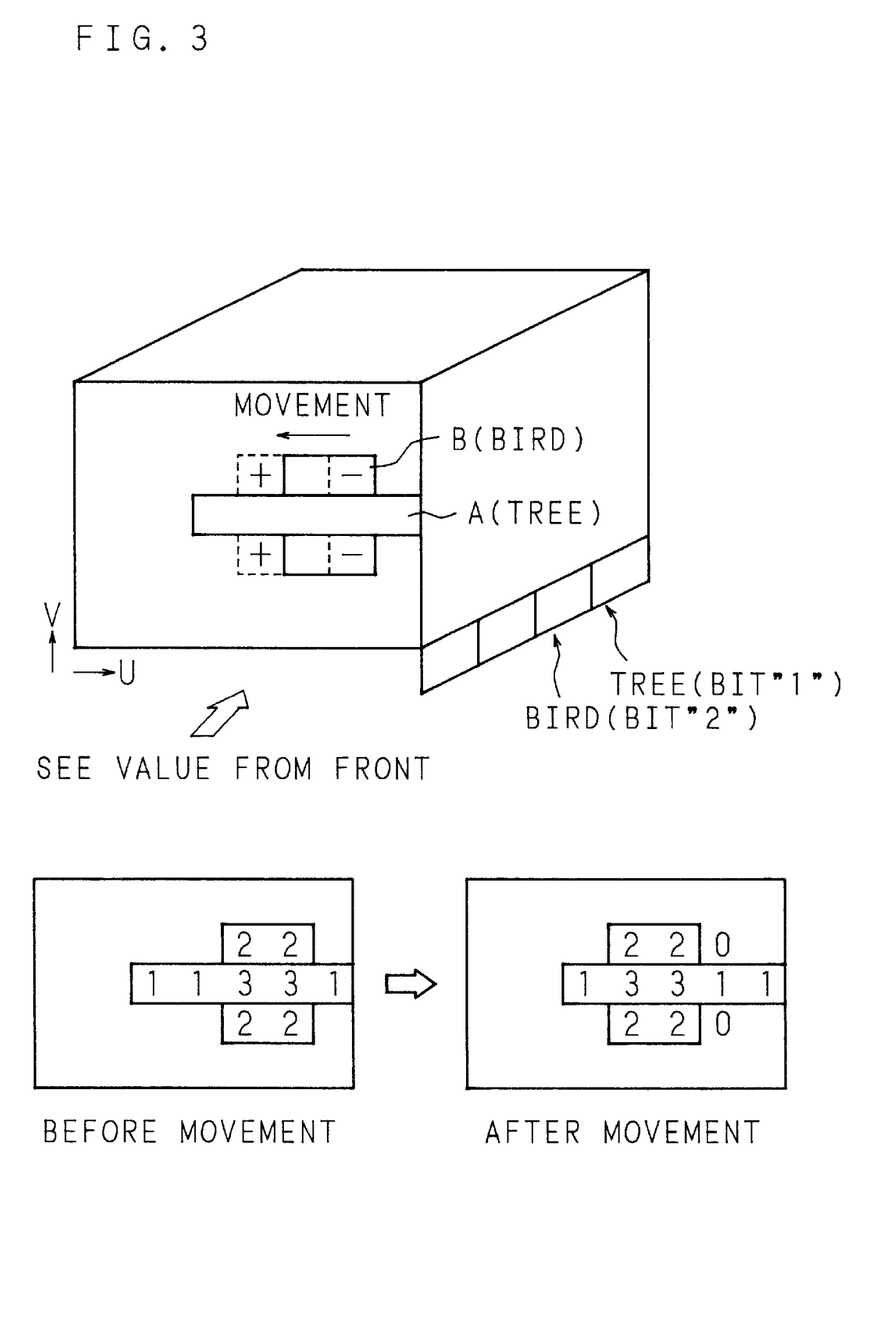
FIG. 3 is a diagram showing an example of how bits are set and reset in an overlay buffer according to the present invention.
Figure 4A:
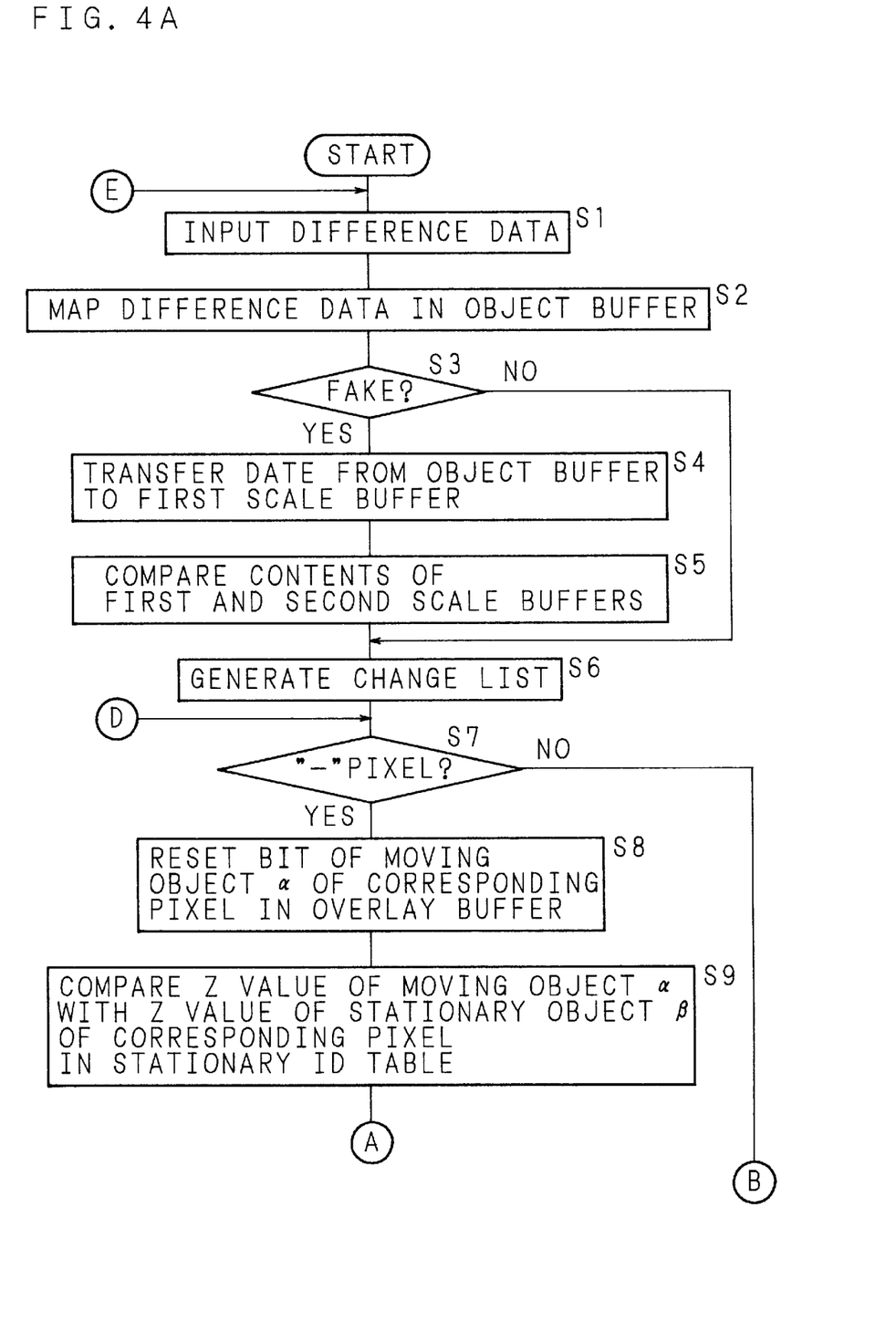
FIGS. 4A to 4D are flowcharts illustrating a processing procedure according to the present invention.
Figure 4B:
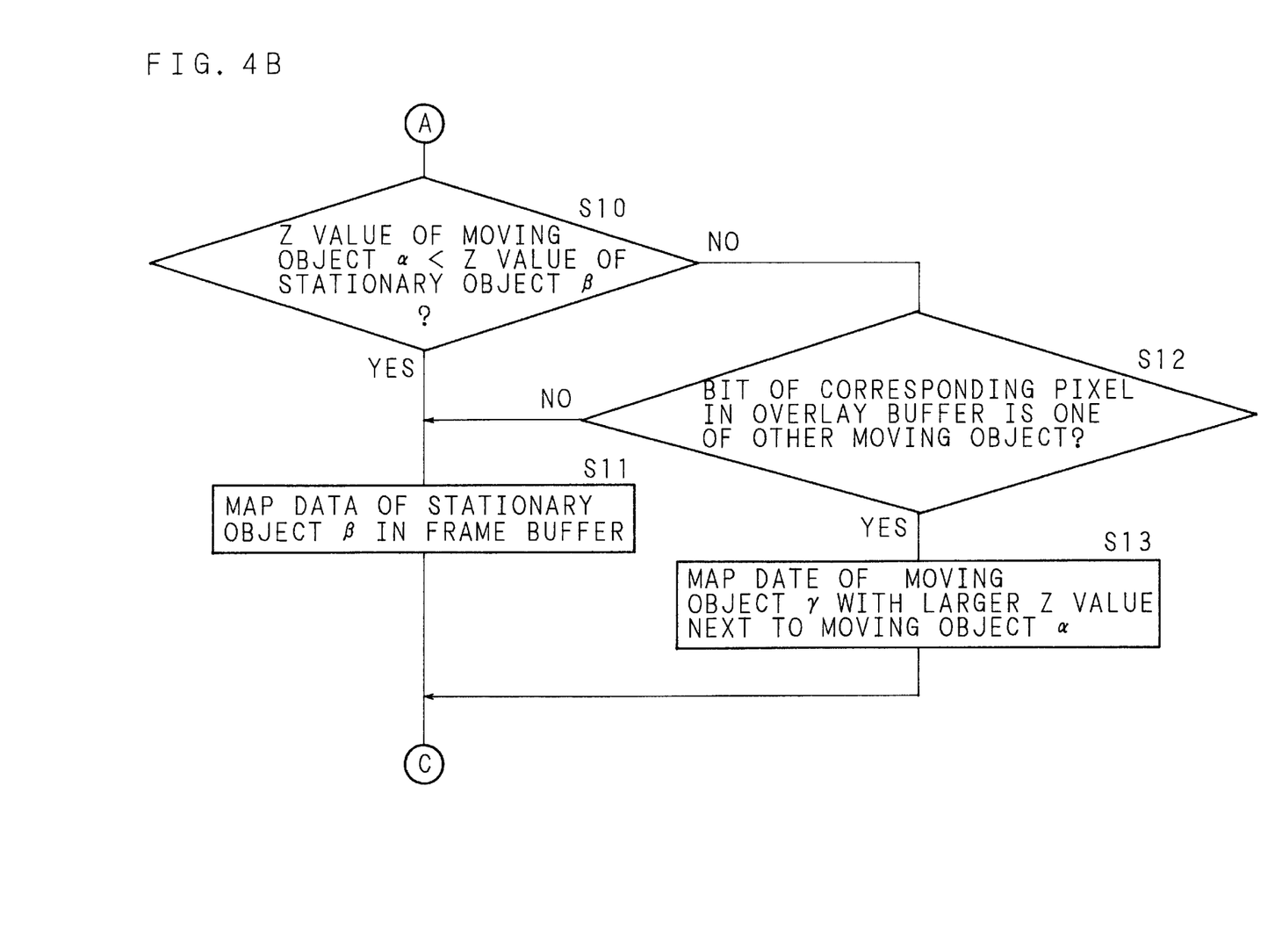
Figure 4C:
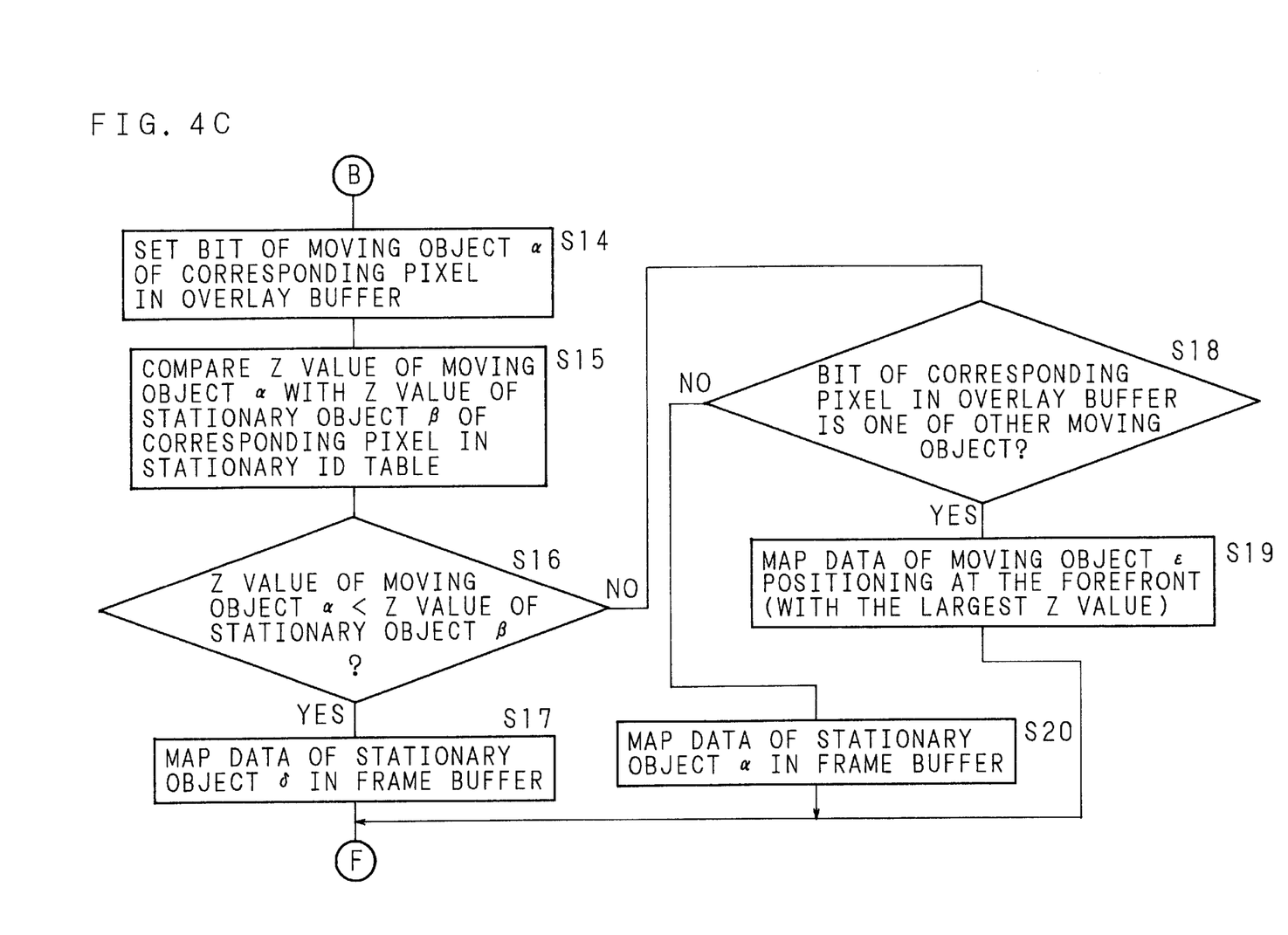
Figure 4D:
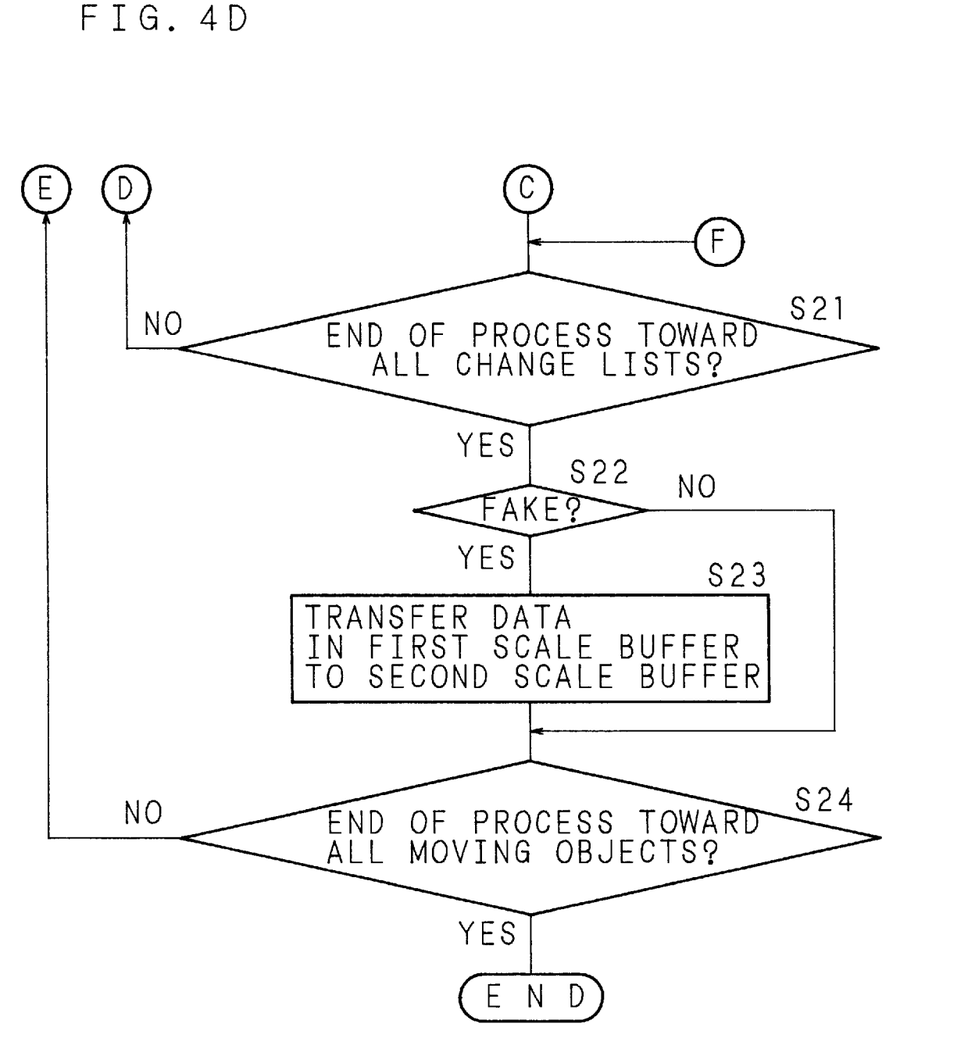
Figure 5:
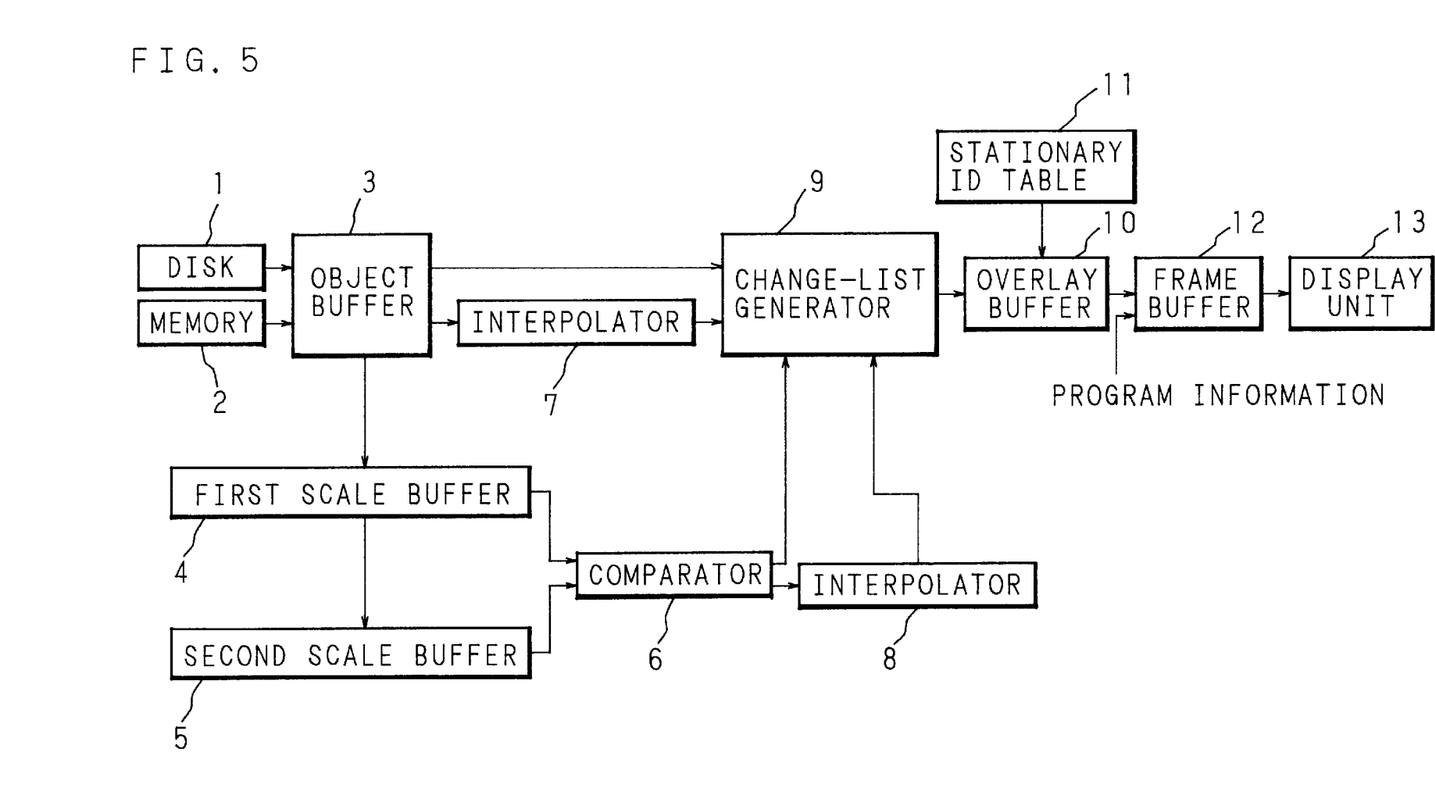
FIG. 5 is a block diagram showing the configuration of an image generating apparatus according to the present invention.

FIG. 3 is a diagram showing an example of how the bits are set and reset in the overlay buffer. The diagram shows a scene, similar to that in FIG. 2, in which a moving object B, such as a bird, moves behind a stationary object A such as a tree. Each object is represented by four bits. Bit 1 is assigned to the tree (stationary object A) and bit 2 is assigned to the bird (moving object B). Each bit position is not dependent on the value of Z. Bit 3 is assigned to pixels where the tree is overlaid on the bird. For pixels into which the bird has newly moved, bit 2 is set, and for pixels out of which the bird has moved, bit 2 is reset and bit 0 is assigned.

A stationary ID table carries object IDs for identifying pixel by pixel the most-forwardly located stationary object of all stationary objects involved. For each "+" pixel or "−" pixel of each moving object, the Z value of the moving object is compared with the Z value of the stationary object in the stationary ID table at the corresponding pixel location, and image data to be displayed at each pixel location is determined. The image data thus determined for each pixel is bit-mapped in a frame buffer.

Next, the processing operations of the present invention will be described with reference to the flowcharts of FIGS. 4A to 4D illustrating the processing procedures. First, interframe difference data for a moving object α is input from the disk or memory (step S1), and the difference data is mapped in the object buffer that carries the corresponding object ID and Z value (step S2). Then, it is determined whether a fake has been applied (step S3); if no fake, pixel-by-pixel change lists are generated based on the difference data (step S6). If there has been a fake, then the data mapped in the object buffer is scaled and is transferred to the first scale buffer (step S4), the contents of the first scale buffer and second scale buffer are compared (step S5), and pixel-by-pixel change lists are generated based on the result of the comparison (step S6).

Next, the following processing in steps S7 to S21 is repeated for each change list. First, it is determined whether or not the change list concerns a "−" pixel (step S7). In the case of a "−" pixel, the bit of the moving object α at the corresponding pixel location in the overlay buffer is reset (step S8). Then, the Z value of the moving object α is compared with the Z value of a stationary object β at the corresponding pixel location in the stationary ID table (step S9), to determine whether the Z value of the moving object α is smaller than the Z value of the stationary object β (step S10).

If the Z value of the former is smaller than the Z value of the latter, the data of the stationary object β is mapped in the frame buffer (step S11). On the other hand, if the Z value of the former is not smaller than the Z value of the latter, then it is determined whether the bit at the corresponding pixel location in the overlay buffer is for some other moving object (step S12). If it is not for any other moving object, the data of the stationary object β at the corresponding pixel location in the stationary ID table is mapped in the frame buffer (step S11). If it is for some other moving object, a moving object γ having a larger Z value than the moving object α and nearest to it is determined, and the data of the moving object γ is mapped in the frame buffer (step S13).

Referring back to step S7, if the change list is not for a "−" pixel, that is, if the change list concerns a "+" pixel, the bit of the moving object α at the corresponding pixel location in the overlay buffer is set (step S14). Then, the Z value of the moving object α is compared with the Z value of a stationary object δ at the corresponding pixel location in the stationary ID table (step S15), to determine whether the Z value of the moving object α is smaller than the Z value of the stationary object δ (step S16).

If the Z value of the former is smaller than the Z value of the latter, the data of the stationary object δ is mapped in the frame buffer (step S17). On the other hand, if the Z value of the former is not smaller than the Z value of the latter, then it is determined whether the bit at the corresponding pixel location in the overlay buffer is for some other moving object (step S18). If it is for some other moving object, then a moving object ε located in the foremost position, which has the largest Z value, is determined, and the data of the moving object ε is mapped in the frame buffer (step S19). If it is not for any other moving object, the data of the moving object α is mapped in the frame buffer (step S20).

In addition, when the object ID having the larger Z value is determined in steps S13 and S19, the bit-pattern which has been processed immediately before in the overlay buffer and the bit-pattern which is processed at present are compared. In the case where these bit-patterns are the same, the object ID which has been processed immediately before can be used. Therefore, it is possible to avoid the comparison of Z values of all objects in which the bits are set, thereby improving the processing speed.

In the above description, it should be added that the stationary object β and the stationary object δ may happen to be the same or may not be the same. Likewise, the moving object γ and the moving object ε may happen to be the same or may not be the same.

Then, it is determined whether the processing has been completed for all the change lists for the moving object α (step S21). If not completed, the process returns to step S7, and the loop of steps S7 to S21 is repeated to process the next change list for the moving object α.

When all the change lists have been processed, it is again determined whether a fake has been applied or not (step S22). If no fake, the process proceeds to step S24. On the other hand, if there has been a fake, the data stored in the first scale buffer is transferred to the second scale buffer (step S23), after which the process proceeds to step S24. The processing for the moving object α is thus completed.

In step S24, it is determined whether the processing has been completed for all moving objects involved. If there is any moving object not processed yet, the process returns to step S1, and the same processing (the loop of steps S1 to S24) as performed on the moving object α is repeated to process that moving object.

FIG. 8 is a block diagram showing the configuration of an image generating apparatus according to the present invention.

In FIG. 8, reference numerals 1 and 2 are a disk and a memory, respectively, in which image data of moving objects are prestored. The disk 1 stores image data of characters, such as birds, that exhibit nonconstant change patterns, while the memory 2 stores image data of characters, such as insects, that make specific movements in repetitive manner. Difference data representing the difference in a moving object between adjacent frames, or between nonadjacent frames, is inputted from the disk 1 or memory 2 into an object buffer 3. For a moving object such as a living creature (insect, bird, etc.) that exhibits a rapid temporal change, difference data representing the difference between adjacent frames is inputted; on the other hand, for a moving object, such as a cloud, thunderbolt, or water, that exhibits a relatively small temporal change, difference data representing the difference between nonadjacent frames is inputted.

There are provided as many object buffers 3 as there are the moving objects to be displayed, in a one for one correspondence, each object buffer 3 carrying an object ID and a Z value. The difference data for each object is mapped in the corresponding object buffer 3.

If there are no fakes, difference data between adjacent frames is fed to a change-list generator 9, and difference data between nonadjacent frames is fed to an interpolator 7. The interpolator 7 performs interpolation using the difference data between nonadjacent frames and thereby creates difference data between adjacent frames, which is supplied to the change-list generator 9.

On the other hand, if there is a fake, the data mapped in the corresponding object buffer 3 is scaled and is transferred to a first scale buffer 4. At this time, data previously stored in the first scale buffer 4 is transferred to a second transfer buffer 5. A comparator 6 compares the data stored in the first and second scale buffers 4 and 5; the result of the comparison between adjacent frames is supplied to the change-list generator 9, while the result of the comparison between nonadjacent frames is supplied to an interpolator 8. The interpolator 8 performs interpolation using the result of the comparison between nonadjacent frames and thereby creates the result of a comparison between adjacent frames, which is supplied to the change-list generator 9.

Based on the difference data between adjacent frames or the result of the comparison between adjacent frames, the change-list generator 9 generates, for each of changed pixels and for each moving object, a change list carrying the two-dimensional coordinates (U, V) of the pixel, an object ID, and data indicating whether the pixel is a "+" pixel or "−" pixel.

In an overlay buffer 10, for each of the thus generated change lists the bit of the corresponding moving object is set if the pixel concerned is a "+" pixel, and reset if it is a "−" pixel. Then, processing is performed: to compare the Z value of the moving object with the Z value of the stationary object at the corresponding pixel location in a stationary ID table 11 that indicates a stationary object most forwardly located on a pixel-by-pixel basis; to search for a moving object located forwardly of the moving object in question, and so on, and image data at each pixel location is mapped in a frame buffer 12. The details of this processing have already been described (S7 to S20 in FIGS. 4A to 4C), and therefore, explanation will not be repeated here.

Finally, an image is displayed on a display unit 13 in accordance with the image data mapped in the frame buffer 12. If it is desired to set a particular outside scene, such as a rainfall, nighttime, etc., program information describing such a particular scene may be inputted to the frame buffer 12 to change the pixel-by-pixel image data in the frame buffer 12.

As described, according to the present invention, since provisions are made to create an image frame by considering depth relationships between objects only for pixels for which a change has occurred between frames, higher-speed image generation can be achieved compared to the prior art.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image generating apparatus by which an image for displaying one or more stationary objects and one or more moving objects on a two-dimensional surface by considering depth relationships between said stationary and moving objects, is generated using prestored image data of each of said two objects, comprising:

means for obtaining a depth relationship relative to another moving object and stationary object for each portion of prestored data of each moving object for which a change has occurred between frames; and means for generating an image on said two-dimensional surface by reference to the thus obtained depth relationship.

2. An image generating apparatus by which an image for displaying one or more stationary objects and one or more moving objects on a two-dimensional surface by considering depth relationships between said objects, is generated using prestored image data of said stationary objects and said moving objects, comprising:

a first buffer for accepting an input of difference data representing a difference between frames of prestored image data of each moving object on said two-dimensional surface, and for expanding said difference data in a bit map with bits uniquely assigned to said moving object on said two-dimensional surface;

a second buffer for setting and resetting, based on said difference data in which a change has occurred between said frames, the bits uniquely assigned to said moving object in said bit map; and a third buffer for bit-mapping pixel data for one frame in accordance with the results of the bit setting and resetting for all moving objects in said second buffer.

3. The image generating apparatus according to claim 2, further comprising a table carrying data used to identify each stationary object ahead of said plurality of stationary objects at its pixel level, the table allowing comparison between the depth coordinate of a stationary object in the table and the depth coordinate of the moving object so as to determine pixel data to be bit-mapped in the third buffer.

4. An image generating apparatus according to claim 2, wherein said difference data represents a difference between nonadjacent frames.

5. An image generating apparatus according to claim 4, further comprising:

means for generating difference data representing a difference between adjacent frames by interpolation from said difference data between nonadjacent frames.

6. An image generation method by which an image for displaying one or more stationary objects and one or more moving objects on a two-dimensional surface by considering depth relationships between said objects, is generated using prestored image data of said stationary objects and said moving objects, comprising the steps of:

obtaining a depth relationship relative to another moving object and stationary object for each of portions of prestored data of each moving object for which a change has occurred between frames; and generating an image by reference to the thus obtained depth relationship on said two-dimensional surface.

7. An image generation method by which an image for displaying one or more stationary objects and one or more moving objects on a two-dimensional surface by considering depth relationships between said objects, is generated using prestored image data of said stationary objects and said moving objects, comprising the steps of:

inputting difference data representing a difference between frames of prestored image data of each moving object on said two-dimensional surface;

expanding said inputted difference data in a bit map with bits uniquely assigned to said moving object;

setting and resetting, based on said difference data in which a change has occurred between said frames, the bits uniquely assigned to said moving object in said bit map; and bit-mapping pixel data for one frame in accordance with the results of the bit setting and resetting for all of said moving objects.

8. The image generating method according to claim 7, further comprising the step of creating a table carrying data used to identify each stationary object ahead of said plurality of stationary objects at its pixel level, the table allowing comparison between the depth coordinate of a stationary object in the table and the depth coordinate of moving object so as to determine pixel data to be bit-mapped in the third buffer.

9. An image generation method according to claim 7, wherein the bit-pattern which has been processed immediately before and the bit-pattern which is processed at present are compared when a stationary object most-forwardly located of said one or more stationary objects is identified.

10. An image generation method according to claim 7, wherein said difference data represents a difference between nonadjacent frames, and difference data representing a difference between adjacent frames is generated by interpolation from said difference data between nonadjacent frames.

11. An image generation method for displaying a plurality of stationary objects and a plurality of moving objects on a two-dimensional surface taking into consideration a depth relationship of each object to all other objects in an image frame and computing changes in image movement and depth relationship in between successive frames, comprising the steps of:

assigning an object ID to each moving object and each stationary object in the image frame;

storing position data for each moving object on a pixel basis in an object buffer, wherein said position data comprises a two-dimensional coordinate and a z-value representing a depth in the image frame;

storing position data on each stationary object on a pixel basis in a stationary ID table, wherein said position data comprises a two-dimensional coordinate and a z-value representing a depth in the image frame;

inputting difference data representing a change between frames of each moving object;

assigning a "+" to each pixel in each moving object when the difference data indicates that the pixel is moving into a coordinate location;

assigning a "−" to each pixel in each moving object when the difference data indicates that the pixel is moving out of a coordinate location;

generating a change list between frames of each moving object comprising the object ID, a two-dimensional coordinate representing the location of each pixel on the two-dimensional surface, and the "+" or "−" assigned to each pixel;

identifying the pixels for each moving object that have the same two-dimensional coordinate as that of each stationary object;

displaying on the two dimensional surface the pixels of the moving object identified as having the same two-dimensional coordinate and assigned a "+" and having a z-value greater than the z-value of the pixel of the stationary object having the same two-dimensional coordinate;

displaying on the two-dimensional surface the pixels of the stationary object identified as having the same two-dimensional coordinate moving object assigned a "+" and having a z-value greater than the z-value of the pixel of the moving object having the same two-dimensional coordinate; and displaying on the two-dimensional surface the pixels of the stationary object when the pixels of the moving object having the same two-dimensional coordinate and the pixels of the moving objects are assigned a "−".

* * * * *